[11] 3,597,578

[72] Inventors Arthur Basil Joseph Sullivan
  Letchworth;
  Peter Thomas Houldcroft, Heathfield,
  Royston, both of, England
[21] Appl. No. 712,782
[22] Filed Mar. 13, 1968
[45] Patented Aug. 3, 1971
[73] Assignee National Research Development
  Corporation
  London, England
[32] Priority Mar. 16, 1967, July 31, 1967, Dec. 5, 1967
[33] Great Britain
[31] 35,021/67, 55,346/67 and 12,447/67

[54] THERMAL CUTTING APPARATUS AND METHOD
  9 Claims, 12 Drawing Figs.
[52] U.S. Cl. .................................................. 219/121 L,
  331/94.5
[51] Int. Cl. ................................................ B23k 27/00
[50] Field of Search ............................................ 219/69,
  121, 121 EB, 130, 137, 70, 74, 343; 331/94.5;
  250/49.5

[56] References Cited
UNITED STATES PATENTS

| | | | |
|---|---|---|---|
| 3,360,398 | 12/1967 | Garibotti | 219/121 |
| 3,387,109 | 6/1968 | Bruma et al. | 219/121 |
| 3,417,222 | 12/1968 | Cannon et al. | 219/121 |
| 3,440,388 | 4/1969 | Otstot et al. | 219/121 |
| 1,324,337 | 12/1919 | Chapman | 219/70 |
| 2,758,186 | 8/1956 | Ludwig | 219/74 |
| 3,242,314 | 3/1966 | Eckles | 219/343 X |
| 3,364,087 | 1/1968 | Solomon et al. | 219/121 L |
| 3,383,491 | 5/1968 | Muncheryan | 219/121 L |
| 3,388,314 | 6/1968 | Gould | 219/68 |
| 3,340,601 | 9/1967 | Garibotti | 29/582 |

*Primary Examiner*—J. V. Truhe
*Assistant Examiner*—R. E. O'Neill
*Attorney*—Kemon, Palmer and Estabrook ABSTRACT: A workpiece is cut or gouged by moving a concentrated laser beam along its surface and directing on to the moving region of the workpiece, at which the laser beam is concentrated, a gas which produces an exothermic reaction at the heated workpiece and sweeps away the products of combustion. In apparatus for supplying a gas to a workpiece the gas is led into a tube and nozzle surrounding the laser beam and is directed at the workpiece through the same nozzle.

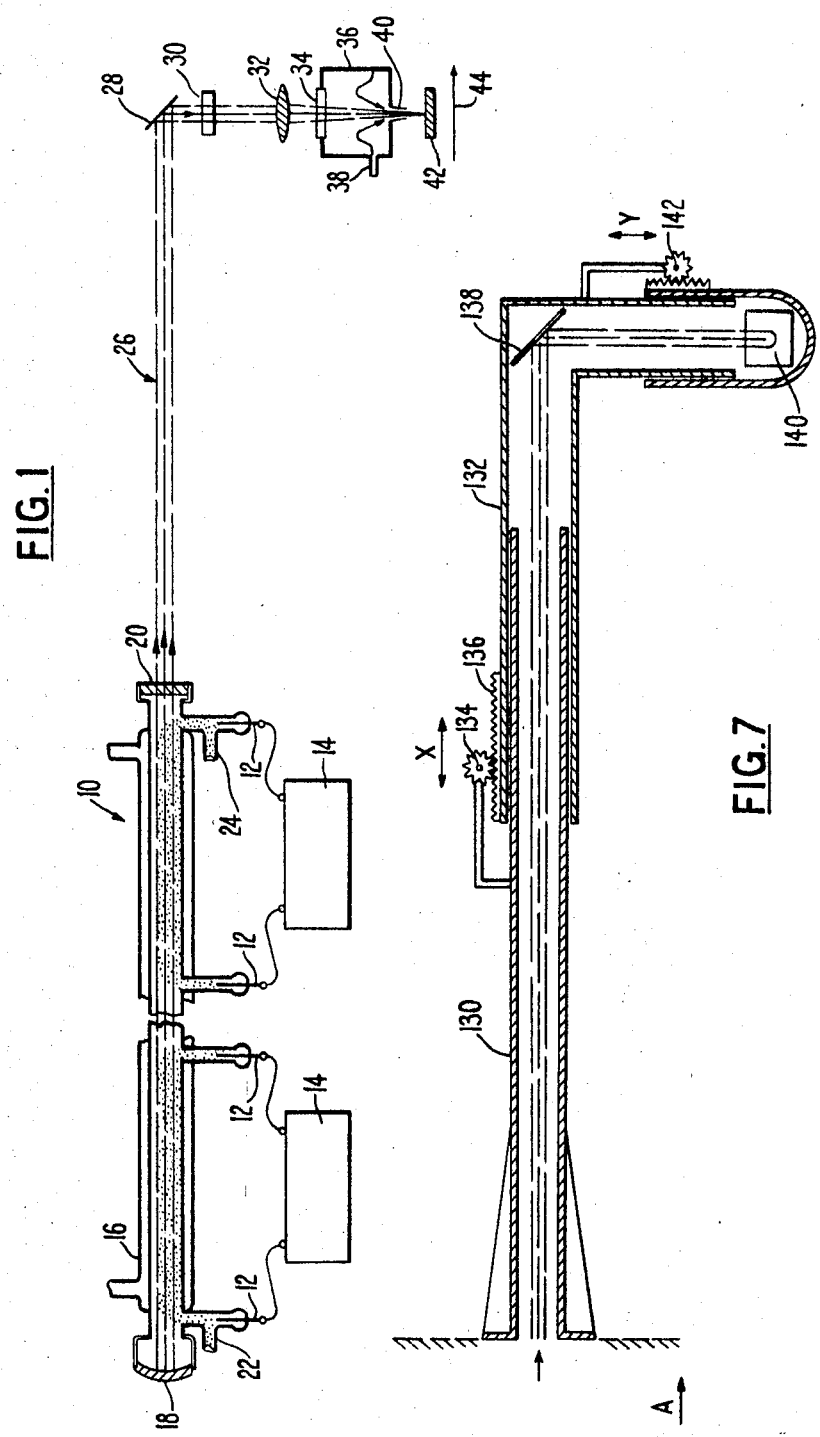

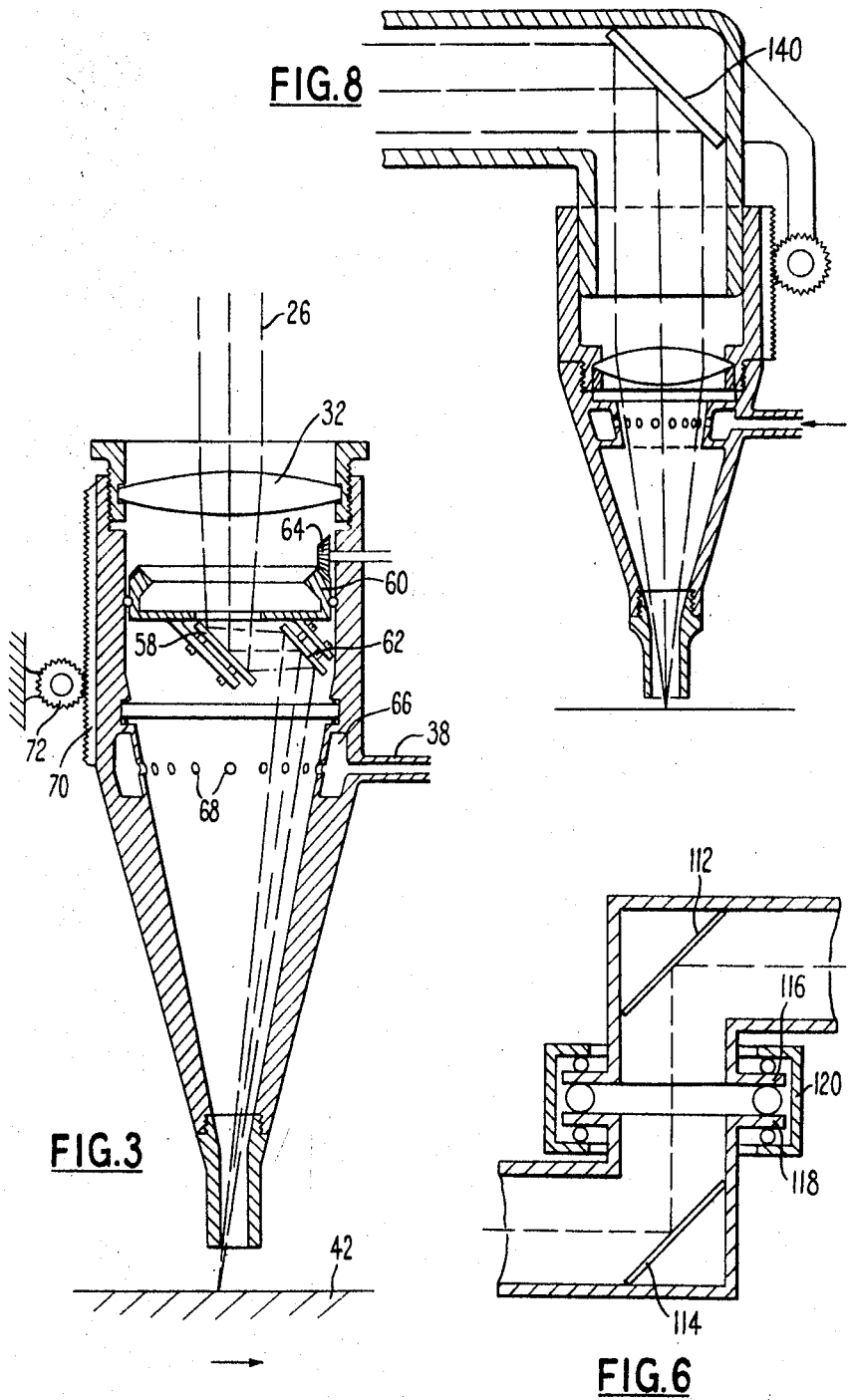

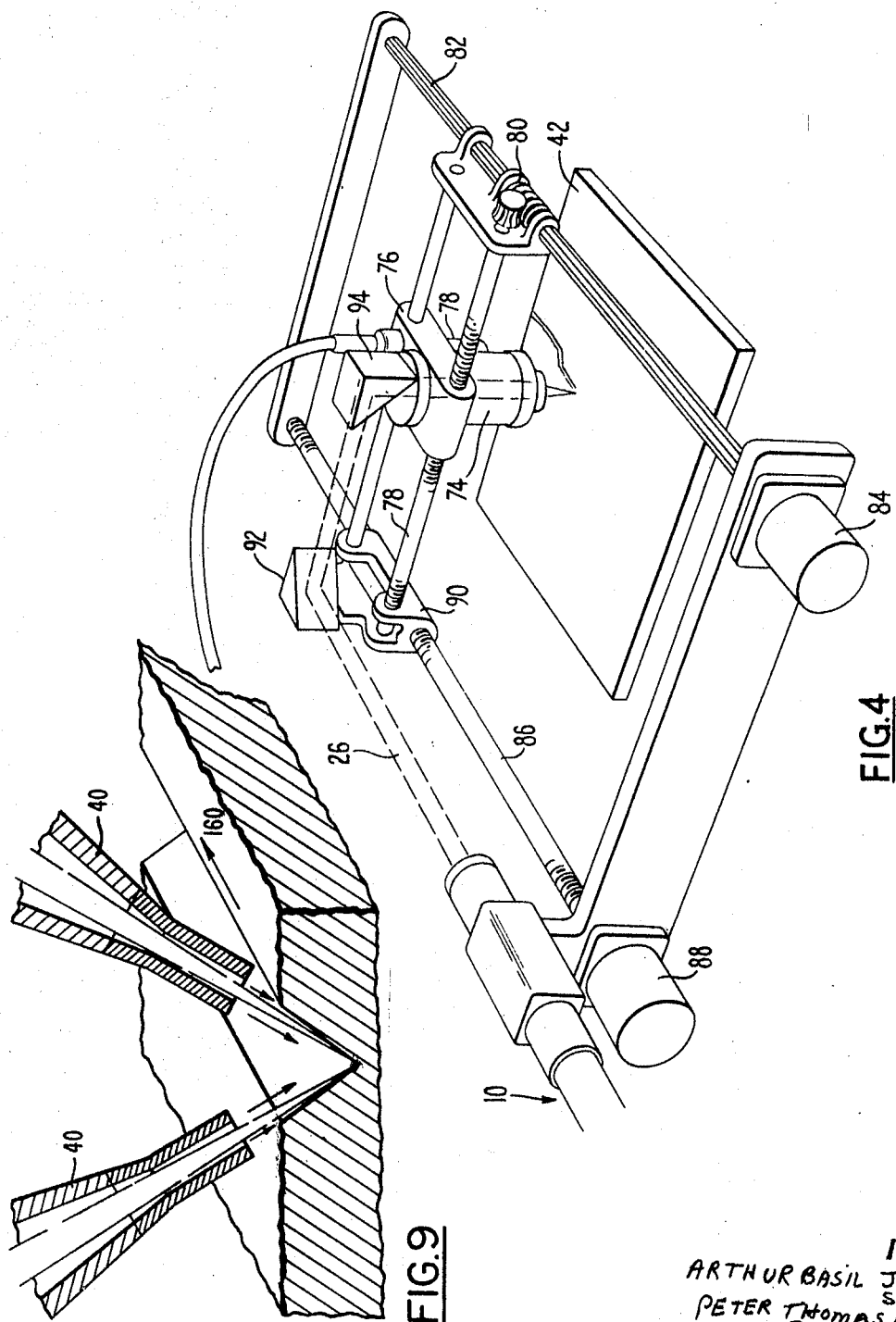

THERMAL CUTTING APPARATUS AND METHOD

Thermal cutting and gouging is widely used for cutting metals where a broad cut is tolerable, the accuracy of the thermal processes being insufficiently high to permit them to be used as an alternative to anything but rough machining. The reason for this inaccuracy is that the heating cannot be sufficiently concentrated, especially where a gas stream used to sweep away the molten metal is of a kind having an exothermic reaction with the preheated area of the metal. This exothermic reaction is self-sustaining when the temperature of the workpiece reaches a predetermined value and consequently the width of the cut varies with the width of the stream of oxygen which is directed at the preheated area. In addition to the inaccuracy of the cut, the existing thermal methods have the further disadvantage that heating over a considerable area of the workpiece tends to damage it, for example by distorting it or affecting its properties or structure.

As a heat source, the laser beam permits an energy concentration of an exceedingly high order and for some years the laser has been known as a piercing instrument where fine holes are required. Moreover, it can be focused to a small spot with considerable accuracy and a laser which can deliver energy to the workpiece at a rate sufficient to boil the metal in its path can achieve a cutting process. Consequently, the laser has been considered as a cutting instrument for metals, to make very narrow cuts such as would not be possible with conventional thermal cutting methods.

We have discovered that if a jet of a gas which produces an exothermic reaction is so directed that it flows on to the region of the workpiece at which the laser beam is focused, not only is there an increase in the rate of cutting but the accuracy and fineness of the cut are substantially unimpaired by the addition of the gas stream, in spite of the fact that the cross-sectional area of this stream at the workpiece may differ by an order of magnitude from that of the laser beam. It seems that the width of the cut is determined largely by the laser beam and not by the gas jet, which controlled the width of cut in the earlier processes of thermal cutting and gouging which utilized an exothermic reaction. It is clear that it is partly due to the fact that the portion of the workpiece directly affected by the laser beam is an extremely narrow strip; however, we believe that it may also be partly due to the fact that the material in this strip is raised very rapidly to a temperature at which it vaporizes or melts and that there is a very steep temperature gradient in the workpiece. Consequently, the proportion of the heat input due to the laser and the exothermic reaction which is consumed as latent heat in melting and vaporizing and thus is removed from the body of the metal by the gas stream is much more significant than in the case of the earlier processes of thermal cutting. There is therefore little spreading of the zone which is at a temperature high enough to take part in the exothermic reaction. We are reinforced in this belief by some observations on the temperature of the metal during a gas-assisted laser-cutting operation. In conventional processes, for cutting mild steel for example, it is known that the exothermic reaction is self-sustaining if the metal is raised to its "kindling" temperature, that is to say that oxygen alone will cut mild steel if the steel is raised to this temperature, which is usually reckoned to be about 875° C. We have observed that in the gas-assisted laser cutting process, the temperature of the affected strip of mild steel is considerably higher than this "kindling" temperature but that in spite of this the process is not self-sustaining at a cutting speed sufficient for the thickness of the metal specimen.

Another factor which convinces us that the effective temperature of the strip which is being cut is considerably higher than that associated with conventional cutting processes is that with an oxygen-assisted laser cutting process we can cut stainless steel (i.e. corrosion-resisting steels and heat-resisting steels having a high chromium content). Stainless steel cannot be cut by an oxyacetylene process because when a stainless steel surface is heated a chromic oxide surface film is formed and this has a melting point of about 2,000° C., which is considerably higher than that of the stainless steel alloy, usually about 1,375° C. With the conventional thermal cutting processes, stainless steel can only be cut if in addition to the oxygen a fluxing or diluting agent is introduced. The combination of the laser beam and an oxygen jet cuts through stainless steel without the need for a fluxing or diluting agent and we therefore assume that the temperature at the heat-affected strip is high enough to melt or vaporize the oxide film, which is then swept away.

Thus it seems that for successful operation a very narrow zone of the workpiece must be raised to a temperature much higher than that normally associated with thermal cutting but that the spread of heat from this zone is very limited and that consequently the exothermically reacting gas does not result in significant self-sustained spreading of the cut.

The invention, therefore, resides in a method of cutting or gouging in which a laser beam is concentrated on a workpiece and the beam and workpiece are moved relatively to one another and in which a jet of a gas which produces an exothermic reaction is directed on to the moving region of the workpiece at which the laser beam is concentrated to provoke the exothermic reaction at the heated metal and to sweep away the products of combustion. Because the exothermic reaction enables more effective use to be made of the laser output, it is no longer necessary to use a laser in which the output is concentrated in periodic pulses.

We have already referred to the absence of significant lateral heat spreading in this process. The absence of a self-sustaining exothermic reaction in the gas-assisted laser cutting process is also evident in the direction of the cut and this provides an additional advantage in that the cutting process can be stopped very rapidly by switching the laser beam off. Consequently, the method lends itself particularly well to machine-controlled thermal cutting.

In addition to the above advantage, the method enables thermal cutting to be achieved without the relatively extensive heat-affected zone associated with earlier thermal cutting processes and without the distortion of the workpiece which sometimes resulted in the latter processes.

Although we can cut stainless steel (and also Nimonic and other refractory metals) without a fluxing agent with the process according to the present invention, there are some materials for which a fluxing agent is useful. For example, ceramic material, brick, tile, concrete, stone, rock and glass do not react exothermically with oxygen and to cut these materials with a laser beam we introduce a metal or a compound which permits an exothermic reaction with the gas and creates a fluxing action with the material to be cut at the point where the laser beam strikes this material. The gas jet then sweeps the fused material or the low melting point mixtures away from the heated area. As an example, the fluxing agent may be fed in powdered form in a gas jet to the heated area and may be iron or may be formed of halides of the alkali metals. In another form the fluxing agent is coated on to the surface of the material to be cut, for example by painting or spraying.

With most of the materials mentioned above, iron may be used as a fluxing agent in conjunction with an oxygen jet. For example, iron powder may be fed into a laser system in an oxygen jet; the iron powder oxidizes rapidly and provides superheated iron oxide which fluxes and cuts the ceramic or other material. Alternatively, the iron may be fed in as wire or strip at the point where the gas jet and the laser beam meet. A further possibility is to feed a volatile or vaporized halide (for example a halide of iron) into an oxygen jet directed at the portion of the workpiece heated by the laser beam. The combination of iron as a fluxing agent with an oxygen jet can also be used for aluminum, which also forms refractory oxides when heated.

The oxygen jet may be directed at the workpiece through a nozzle through which the laser beam emerges or it may be directed obliquely at the surface of the workpiece. In the first case, the nozzle through which the beam and gas jet emerge, although extremely compact, is not subjected to substantial heating and thus the intense potential heating of the laser beam is safely combined with an active gas such as oxygen, for example. This is contrary to experience in the "coarse" forms of thermal cutting employing a reactive gas, in which substantial heating of the nozzle takes place. In fact, in the plasma torch which, until the use of the laser for thermal cutting, achieved the highest form of convergence and concentration of heat, it was not possible to use a gas producing an exothermic reaction because the hot parts of the torch would be rapidly oxidized and eroded, and as a consequence only an inert gas could be used, the molten metal being swept away by the inert gas.

For gouging, an oblique arrangement is necessary and more than one laser can be used. Two laser beams, each surrounded by a jet of the reactive gas may be arranged at an angle to one another so that the beams converge to a point in the neighborhood of the workpiece. These beams make parallel cuts which converge to a point below the surface of the workpiece, thereby cutting away a portion of triangular cross section along the line of the cut. With a single laser and a jet separate from the laser beam, if the laser beam strikes the surface perpendicularly, a high jet angle is suitable for cutting and a low jet angle is suitable for gouging, the oblique jet then blowing out the metal melted by the heat of the laser and the exothermic reaction. Both the oxygen jet and the laser beam may strike the workpiece at oblique angles; they may be incident on the workpiece from opposite sides of a plane perpendicular to the workpiece or in some cases (for example some forms of gouging) they may approach the workpiece from the same side of this plane. In this case, the jet angle is preferably less than 45° to the workpiece and the beam angle not more than 30° from the vertical. For the purposes of this specification, the term "gouging" is intended to include machining operations such as parting a bar in a lathe, turning and planing.

As has been stated above, the width of the cut is primarily determined by the width of the laser beam and it may be increased, provided that the power of the laser is sufficient, by increasing the effective diameter of the beam at the work surface, that is to say by bringing the beam to a focus above the work surface, sometimes within the nozzle itself. The increase in width is sometimes desirable for thicker workpieces, where the width at the base of the cut might otherwise be insufficient to allow the passage of enough of the gas.

An alternative method of increasing the width of cut which does not require a laser of such high power, is to give the laser beam a cyclically repetitive movement transverse to the direction of the cut, the jet of gas being directed on to the region of the workpiece scanned by the laser beam as described above. In the preferred form, the relative movement between the laser beam and the surface is a combined linear movement in the required direction of cut and a circular movement symmetrical about the centerline of the cut. This arrangement has the advantage that if the line of cut turns, the circular movement superimposed on the motion in the direction of the line of cut still imparts to the laser beam the same motion transverse to the direction of cut.

In order that the invention may be better understood some examples of apparatus for carrying the invention into effect will now be described with reference to the accompanying drawings, in which:

FIG. 1 shows diagrammatically the arrangement of a first form of apparatus;

FIG. 3 shows a form of nozzle for imparting a circular movement to the laser beam at the surface of the workpiece;

FIG. 4 shows the laser cutting head mounted on a traverse platform;

FIG. 6 is a sectional view through a rotating joint used in the apparatus of FIG. 5;

FIG. 7 illustrates a further form of apparatus for positioning the cutting head in relation to the workpiece;

FIG. 8 shows in section the nozzle used in the apparatus of FIG. 7; and

FIG. 9 shows a further form of apparatus employing two laser beams for gouging.

Figure 2A:
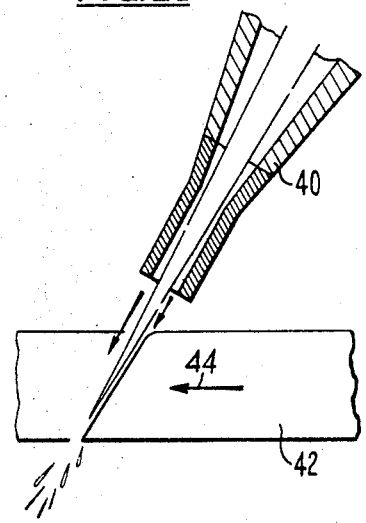
FIGS. 2a, 2b, 2c and 2d show diagrammatically the cutting and gouging of metals.

In FIG. 1, the laser 10 is of the carbon dioxide-nitrogen-helium type and has a length of 10 meters and a bore of 30 mm. There are five sections to the tube, only two being shown in the diagram, and each section has its own electrodes 12 and its own electrical supply 14. The power supply provides 20 kv. for striking and 9 kv. at 45 m.A. when the laser is running. The laser body 16 has a fully reflecting concave mirror of gold-surfaced stainless steel at one end and a plane semireflecting germanium disc 20 at the other end. The concave mirror has a focal length slightly in excess of 10 meters. The gas in which the discharge is to be created flows into the laser body through the inlet 22 and out from the laser body through the outlet 24.

It should be understood that the design and operation of the laser form no part of the present invention and it will be sufficient to state that when the laser is in operation a substantially parallel beam of coherent light emerges from the laser through the disc 20. In the present case, the laser was operated from an AC supply of 50 Hz. and consequently the output was pulsed at 100 pulses per second. With an AC driven gas laser, the energy output does not of course follow either the sine wave of current input or the approximately square voltage waveform of the tube. The energy output may take the form of a distorted square wave with a peak of the leading side. It is not known what effect variations in such an output might have on the cutting process but where the total power output is only marginally sufficient to carry out gas-assisted laser cutting at a particular speed or on a particular thickness, then alterations in the mark-space ratio or in the waveform may be deleterious to the process, since they may lead to an inability to sustain the reaction.

The emergent beam 26 is reflected by an aluminized mirror 28 through a safety shutter 30 to a focusing lens 32. From this lens, the beam passes through a window 34 into an oxygen chamber 36. Oxygen enters this chamber through an inlet 38 and emerges in the direction of the workpiece through a nozzle 40. The axis of the laser beam passes centrally through the nozzle 40 and the beam is brought to a focus by the lens 32 at or close to the surface of the workpiece 42. The lens 32 can be dispensed with if the mirror 28 is replaced by a parabolic mirror suitably positioned off the optical axis. A focal position 1/16 inch beyond the nozzle has been found satisfactory when using an oxygen jet of diameter 0.10 inch; this arrangement gives a clean and stable cut.

As indicated by the arrow 44, the workpiece is moved horizontally to permit the laser, assisted by the oxygen stream, to make a cut. As the cut proceeds, the molten or vaporized material is ejected through the cut zone by the oxygen jet which also serves to provide an exothermic reaction, as described above.

We have achieved cuts of from 0.015 inch to 0.025 inch width in mild steel, high carbon tool steel and stainless steel of 0.10 inch thickness at speeds up to 40 inches per minute, provided that a minimum energy density is achieved. It appears that the addition of the oxygen jet does not greatly affect the width of the cut, although the addition of the oxygen jet permits cutting of metal several times thicker than what can be achieved with the unaided laser. The width of cut is governed primarily by the diameter and energy of the laser beam, but also by the speed of movement and the thermal diffusivity of the workpiece. The narrow cut gives a precision not previously obtained with oxyacetylene cutting. Increased laser power enables a higher cutting speed but with an AC-operated laser, the speed is limited by the pulsed nature of the supply. DC operation removes this difficulty.

The smoothness and stability of cutting depends upon exceeding a minimum speed which varies according to the laser power and the material which is being cut. Below this speed, (or below a threshold power) the laser loses control and the melting begins to propagate beyond the area directly heated by the laser. This results in melting large holes and in intermittent cutting operation. As the speed increases, the laser again assumes control and gives a fast clean cut of small width. The threshold laser power is allied to the minimum speed, since if the power is insufficient the threshold speed of cutting cannot be achieved. For cutting mild steel of 0.10 inch thickness at a speed of 40 in./min., we found that it was desirable for the laser power to exceed 300 watts. For thickness of 0.030 inch, a power of 250 watts gave a cutting speed of 55 in./min., and a power of 190 watts gave a speed of 17½ in./min. For a thickness of 0.060 inch, the cutting speed with a power of 250 watts was reduced to 17½ in./min. It may in some cases be desirable to provide extra power for starting and this can be achieved by generating an initial laser pulse of an energy greater than its continuous rating.

Figure 2B:
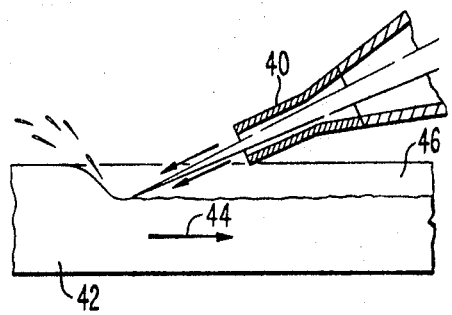

In FIG. 1, the laser beam and gas jet strike the workpiece perpendicularly to its surface. However, the nozzle through which the beam and jet emerge can be arranged at an angle to the workpiece surface, as shown in FIG. 2a. FIG. 2b shows a gouging operation in which the nozzle is arranged at an angle of about 30° to the workpiece surface. The oxygen jet blows the molten metal ahead of it and the workpiece 42 travels in the direction indicated by the arrow 44. In this way a groove 46 is formed in the workpiece.

The width of the groove may be greater at the surface of the workpiece of a cut obtained with the same nozzle and laser and we believe that this is because the molten material is not blown straight through the workpiece, as in the case of a cut, but instead gives up some of its heat energy on its way up the sides of the groove.

Figure 2C:
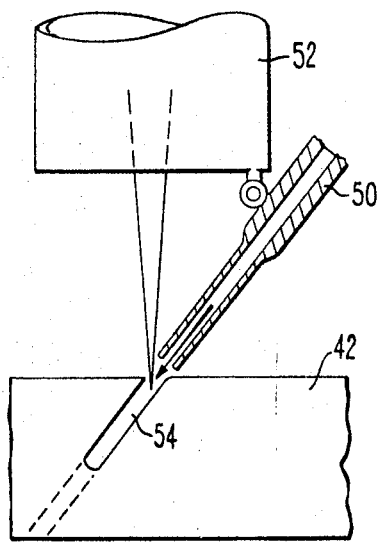

FIG. 2c illustrates apparatus in which the 50 through which the oxygen is discharged towards the workpiece is distinct from the tube 52 through which the laser beam emerges. The nozzle is set at an angle to the beam axis. The workpiece is travelling in a direction perpendicular to the plane of the paper. As shown in the diagram, the direction of the cut 54 for such a direction of travel is governed by the direction of the oxygen jet rather than that of the laser beam. In this way we have produced a bevelled edge on a workpiece.

Figure 2D:
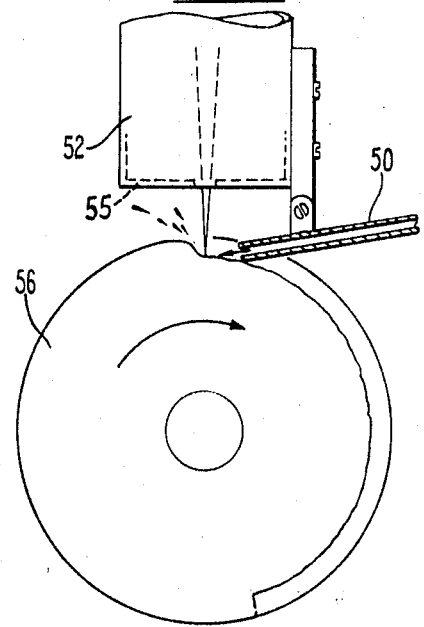

FIG. 2d shows the use of a laser and a gas jet in a "parting" operation to form a groove in a rotating workpiece 56 of circular cross section. The groove may be continued until a shaft is cut through. A diaphragm 55 prevents the reflection of excessive light energy from the workpiece back into the laser.

As explained above, for cutting thicker workpieces, it may be desirable to increase the width of the cut. The laser beam can be slightly defocused, that is to say brought to a focus above the work surface, provided that the laser has sufficient power. As an alternative to defocusing the laser beam, a nozzle of the kind shown in FIG. 3 can be used. In this figure, the beam 26, on emerging from the focusing lens 32 impinges on a mirror 58 mounted axially on a revolving ring 60. The beam reflected from the mirror 58 is again reflected by a mirror 62 mounted at the edge of the ring 60. The ring 60 is driven by a pinion 64 so that the mirror 62 rotates bodily around the axis of the nozzle. The arrangement is such that the focused laser beam at the surface of the workpiece 42 describes a succession of small circles on the latter, these circles being symmetrical about the line of the cut resulting from the relative movement of the workpiece and nozzle. With a suitable relationship between the circular movement and the linear movement, the overlap of successive circles can be such that all elements in the track of the circle are scanned by the laser beam. However, we have found that when a laser beam scans in a circle in the way described, the reaction tends to spread into the small area of metal surrounded by the circle. Consequently, it is possible to cut through for the whole width of the circle without a complete overlap, the laser beam diameter and the oxygen supply being so chosen that the spread of the reaction is just enough to remove the "centers" of the circles formed by the movement of the laser beam. The gas jet may be coaxial with the laser beam, as shown in FIG. 3, or the gas may flow from a separate angled nozzle.

To avoid inserting a driving shaft through the wall of the laser tube, the ring 60 can be driven by an induction motor if desired. Other possibilities are to use a rotating prism to provide the circular movement of the beam or to arrange a transparent plate in the path of the laser beam at an angle to the beam, so that the emergent beam is parallel to but offset with respect to the incident beam. The plate or block is now rotated about the axis of the incident beam to cause the emergent beam to sweep out a circle. An elliptical beam movement could be produced by two elements arranged in series in the path of the beam and at 90° to one another, the angle of each to its incident beam being altered in an oscillatory manner by an electromechanical, electrostatic or magnetostrictive device.

In FIG. 3, the oxygen entering the nozzle through the inlet 38 passes into a diffusing ring 66 and enters the chamber through a series of holes 68 in the inner wall of the diffusing ring.

A rack 70 and pinion 72 are provided to permit adjustment of the cutting head.

FIG. 4 shows the cutting head 74 mounted on an x-y traverse platform to permit the head to be positioned at any point over the surface of a workpiece 42 without movement of the laser 10. The cutting head 74 is mounted on a block 76 which also carries the oxygen supply tube 78a. The block 76 is mounted on a lead screw 78, the rotation of which provides the Y traversing movement, the shaft 78 being rotated by a sliding worm 80 on a splined shaft 82 driven by a motor 84. The x traversing movement is obtained by the rotation of a lead screw 86 by a motor 88, the shaft 78 being supported on a block 90 engaged on the lead screw 86. The parallel beam 26 is reflected by the prisms 92 and 94 before reaching the nozzle 74.

Figure 5:
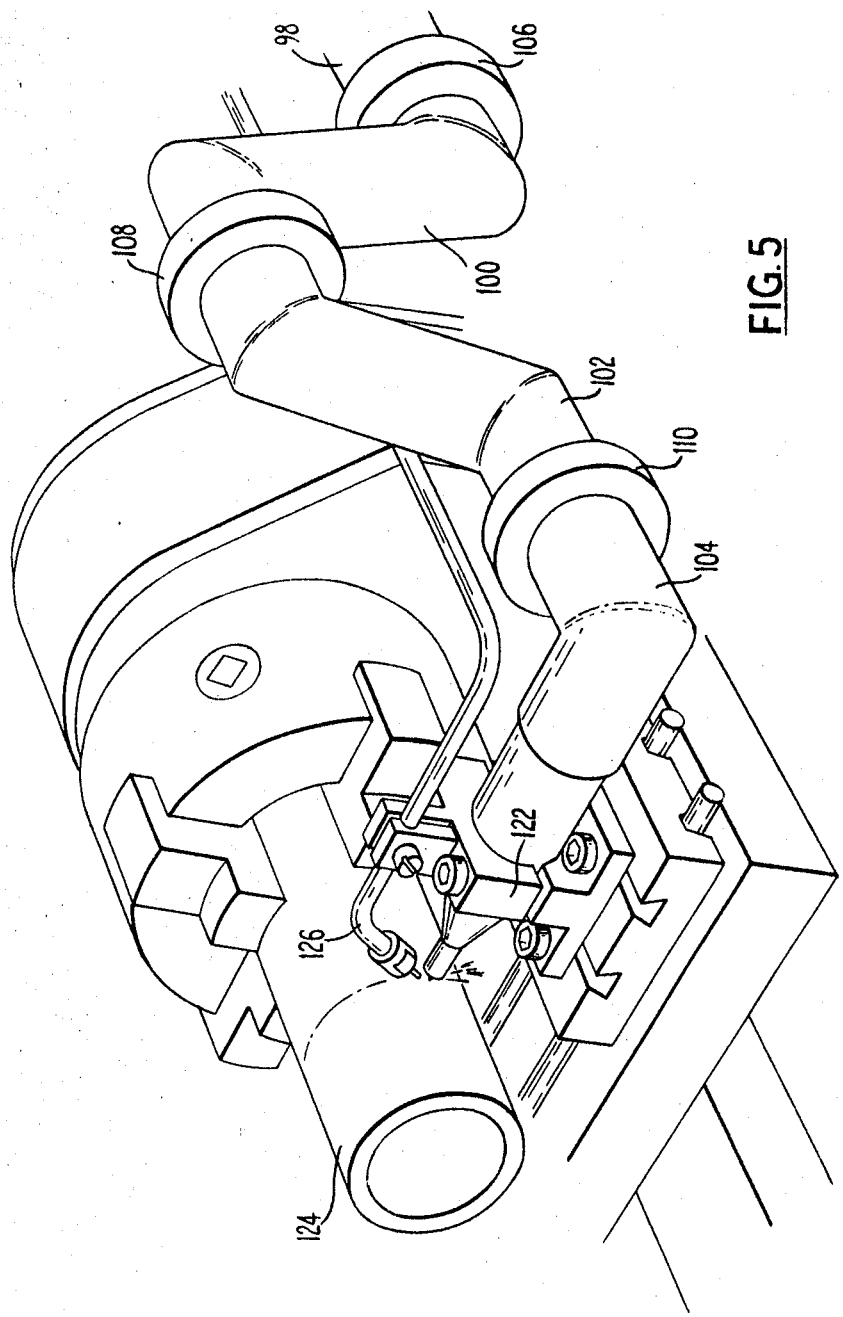
FIG. 5 illustrates a further form of apparatus for relatively moving the cutting head and the workpiece.

Alternative apparatus for guiding the laser beam to the workpiece is shown in FIGS. 5 and 6. In this case the laser beam travels along four guide sections 98, 100, 102 and 104, each of the last three sections having at least one right-angle bend, the sections being separated by rotating joints 106, 108 and 110. One of these rotating joints is shown in section in FIG. 6. From this figure it will be seen that at the corners of the guide sections there are reflecting surfaces 112 and 114 and that each guide section terminates in a flange 116 and 118 which are separated from each other and the upper and lower walls of a gland 120 by ball bearings.

In FIG. 5, the laser nozzle is arranged in the tool holder 122 of a conventional lathe and the beam is directed by a cylindrical workpiece 124. The oxygen jet emerges from a separate tube 126. In this example a groove is being formed around the cylindrical surface of the workpiece.

Other combinations of rotating joints will give different ranges of movement; for example, a first rotating joint in a vertical plane would give angular movement in elevation of the cutting head and a second rotating joint in a horizontal plane would give angular movement in azimuth.

In a further alternative form of laser guide shown in FIGS. 7 and 8, the beam passes through telescopic arms. The first of these consists of two parts 130 and 132, carrying a pinion 134 and a rack 136 respectively. The section 132 has a right-angle bend with a reflector 138 at the corner and forms part of a further telescopic arm the elongation of which is similarly controlled by a rack and pinion. This arm terminates in a further reflector 140 which, as shown in FIG. 8, reflects the beam into a final telescopic arm terminating in a nozzle of the kind shown in the earlier examples. The arrangement permits movement of the focused laser beam to any point within a three-dimensional space governed by the length of the telescopic movements. It also permits a fairly rigid construction and involves only two reflections; these considerations are important since vibration will cause movement of the laser beam and reflections increase the extent of movement at the workpiece. Apparatus of the kind shown lends itself to program control; as an example, sine and cosine signals controlling the racks 134 and 142 will cause the laser beam to cut holes.

The nozzle and aligned guide tube shown in FIG. 8 can also be used in the apparatus of FIG. 4.

FIG. 9 shows use of a pair of nozzles 40, for example of the type shown in FIG. 2a, each nozzle being directed at an angle toward the surface of the workpiece 160. The laser beams projected through the nozzles converge at a point below the surface of the workpiece and the result is that a substantially V-shaped cut is removed from the workpiece in response to relative movement between the nozzles as a pair and the workpiece proper.

The guide tubes of FIGS. 5 to 8 also readily permit the containment of a gas for protecting the optical reflecting surfaces. With a carbon dioxide laser, for example, generating radiation at a wavelength of 10 microns, the windows and lenses have to be of special material. Germanium can be used but is expensive and the cheaper potassium bromide suffers from the disadvantage that it is hydroscopic and therefore liable to deteriorate unless precautions are taken. A dry warm gas, such as nitrogen, in the guide tube system prevents deterioration of the potassium bromide surfaces.

Among refractory metals cut by the method of the invention are tantalum, a tantalum alloy containing 10 percent tungsten and a niobium allow containing 10 percent tungsten. We have also cut Nilo K, an iron-nickel alloy.

We claim:

1. A method of cutting completely through a workpiece comprising:
   concentrating a laser beam on the workpiece;
   moving the beam and workpiece relatively to one another;
   directing a jet of a gas which produces an exothermic reaction onto the moving region of the workpiece at which the laser beam is concentrated to provoke the exothermic reaction at the heated workpiece;
   continuing the foregoing steps to cut completely through the workpiece; and
   sweeping products of combustion through the cut by means of the exothermically reactive gas jet.

2. A method in accordance with claim 1, additionally comprising subjecting the laser beam to a cyclically repetitive movement transverse to the direction of the cut.

3. A method in accordance with claim 2, in which the relative movement between the laser beam and the surface is a combined linear movement in the required direction of cut and a circular movement symmetrical about the centerline of the cut.

4. A method in accordance with claim 1, in which the laser beam is focused slightly above the surface of the workpiece.

5. A method in accordance with claim 1, in which the laser is energized to give a pulse of higher power than its continuous rating to initiate the cutting or gouging process.

6. A method in accordance with claim 1, in which the workpiece is stainless steel.

7. A method as defined by claim 1 in which said jet of gas coaxially surrounds said laser beam.

8. A method of gouging a workpiece comprising:
   concentrating a laser beam onto a workpiece;
   moving the beam and the workpiece relatively to one another; and
   directing a jet of gas which produces an exothermic reaction onto the moving region of the workpiece at which the laser beam is concentrated to provoke an exothermic reaction of the heated workpiece, said gas jet being delivered to said workpiece at an angle less than 45° and under sufficient pressure to sweep away resulting reaction products.

9. A method of gouging a workpiece comprising: concentrating two laser beams on to the workpiece, the laser beams being directed at an angle to one another so that their beams converge to a point in the neighborhood of the surface of the workpiece to make parallel cuts which converge to a point below the workpiece surface;
   directing two jets of a gas which produces an exothermic reaction onto the workpiece, each jet being directed at an angle onto the moving region of the workpiece at which a different laser beam is concentrated to provoke an exothermic reaction at the heated workpiece; and
   sweeping products of combustion out of the resulting groove by means of the angled exothermically reactive gas jets.